(12) United States Patent
Lopatin et al.

(10) Patent No.: US 12,086,236 B2
(45) Date of Patent: Sep. 10, 2024

(54) SYSTEM AND METHOD FOR IDENTIFYING A CRYPTOR THAT ENCODES FILES OF A COMPUTER SYSTEM

(71) Applicant: AO Kaspersky Lab, Moscow (RU)

(72) Inventors: Evgeny I. Lopatin, Moscow (RU); Dmitry A. Kondratyev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 357 days.

(21) Appl. No.: 17/320,362

(22) Filed: May 14, 2021

(65) Prior Publication Data

US 2022/0058261 A1 Feb. 24, 2022

(30) Foreign Application Priority Data

Aug. 24, 2020 (RU) .......................... RU2020128090

(51) Int. Cl.
| | | |
|---|---|---|
| *G06F 21/56* | (2013.01) | |
| *G06F 18/214* | (2023.01) | |
| *G06F 18/2413* | (2023.01) | |
| *G06F 21/54* | (2013.01) | |
| *G06F 21/55* | (2013.01) | |
| *G06N 20/00* | (2019.01) | |

(52) U.S. Cl.
CPC ............ *G06F 21/54* (2013.01); *G06F 18/214* (2023.01); *G06F 18/24147* (2023.01); *G06F 21/554* (2013.01); *G06F 21/565* (2013.01); *G06F 21/568* (2013.01); *G06N 20/00* (2019.01)

(58) Field of Classification Search
CPC ............................... G06F 21/55; G06F 21/566
See application file for complete search history.

(56) References Cited

U.S. PATENT DOCUMENTS

| | | | |
|---|---|---|---|
| 9,852,289 B1 | 12/2017 | Mann | |
| 2007/0039048 A1* | 2/2007 | Shelest | G06F 21/566 726/22 |
| 2011/0162070 A1* | 6/2011 | Krasser | G06F 21/564 706/20 |
| 2013/0227300 A1* | 8/2013 | Golovkin | H04L 63/1408 713/188 |
| 2015/0058987 A1 | 2/2015 | Thure et al. | |
| 2018/0018458 A1 | 1/2018 | Schmugar et al. | |
| 2018/0121650 A1* | 5/2018 | Brown | G06F 21/568 |
| 2018/0248896 A1* | 8/2018 | Challita | G06F 21/554 |
| 2019/0114420 A1* | 4/2019 | Chistyakov | G06F 21/564 |
| 2019/0332766 A1* | 10/2019 | Guri | G06F 21/565 |
| 2020/0097653 A1* | 3/2020 | Mehta | G06N 3/045 |

(Continued)

FOREIGN PATENT DOCUMENTS

RU 2622630 C2 12/2016

*Primary Examiner* — Ponnoreay Pich
(74) *Attorney, Agent, or Firm* — ArentFox Schiff LLP; Michael Fainberg

(57) ABSTRACT

Disclosed herein are systems and methods for identifying a cryptor that encodes files of a computer system. An exemplary method comprises, identifying one or more files into which a data entry is performed by a suspect process; for each identified file, determining characteristics of the identified file, identifying classes of file modifications using a trained machine learning model and respective characteristics of the identified file, identifying a suspect process as being associated with the cryptor based on the identified classes of file modification of the file, and protecting the computer system from the cryptor.

18 Claims, 8 Drawing Sheets

(56) References Cited

U.S. PATENT DOCUMENTS

| | | | |
|---|---|---|---|
| 2020/0210580 A1* | 7/2020 | Strogov | G06N 20/20 |
| 2020/0279043 A1* | 9/2020 | Thornton | G06N 5/022 |
| 2022/0058261 A1* | 2/2022 | Lopatin | G06F 18/24147 |
| 2022/0292198 A1* | 9/2022 | Lopatin | G06F 21/561 |

\* cited by examiner

| | | | | |
|---|---|---|---|---|
| fakenet.1.4.3.zip.id_4ABDA8C9.[day4pay@tutanota.com].adobe | 10.04.2019 17:33 | ADOBE File | 6 621 KB |
| flat_land.pdf.id_4ABDA8C9.[day4pay@tutanota.com].adobe | 10.04.2019 17:33 | ADOBE File | 937 KB |
| Info | 10.04.2019 17:34 | HTML Application | 14 KB |
| odbg110.zip.id_4ABDA8C9.[day4pay@tutanota.com].adobe | 10.04.2019 17:33 | ADOBE File | 1 303 KB |
| OLLYDBG.EXE.id_4ABDA8C9.[day4pay@tutanota.com].adobe | 10.04.2019 17:33 | ADOBE File | 1 092 KB |
| providers.txt.id_4ABDA8C9.[day4pay@tutanota.com].adobe | 10.04.2019 17:33 | ADOBE File | 88 KB |
| provsearch.py.id_4ABDA8C9.[day4pay@tutanota.com].adobe | 10.04.2019 17:33 | ADOBE File | 1 KB |
| Security life.docx.id_4ABDA8C9.[day4pay@tutanota.com].adobe | 10.04.2019 17:33 | ADOBE File | 657 KB |
| SpaceTime.mp4.id_4ABDA8C9.[day4pay@tutanota.com].adobe | 10.04.2019 17:34 | ADOBE File | 12 574 KB |
| Tak.jpg.id_4ABDA8C9.[day4pay@tutanota.com].adobe | 10.04.2019 17:33 | ADOBE File | 11 KB |
| Wireshark pdb-win32- 2.2.1.zip.id_4ABDA8C9.[day4pay@tutanota.com].adobe | 10.04.2019 17:33 | ADOBE File | 84 433 KB |

Fig. 2a

| Name | Date modified | Type | Size |
|---|---|---|---|
| _HELP_INSTRUCTION | 10.04.2019 16:50 | Text Document | 1 KB |
| 8D753DD7C694C1784651EB279F0B4AFB30.DLL | 10.04.2019 16:50 | Application extens... | 1 092 KB |
| 19BA7DD71C1E8C8AAO2DEE3B1E1D7C036.DLL | 10.04.2019 16:50 | Application extens... | 937 KB |
| 19F72A6E3999CB9E9DAF077D3B96AF1A.DLL | 10.04.2019 16:50 | Application extens... | 657 KB |
| 9464C9F79D4A568B18287817 2F4B3A37.DLL | 10.04.2019 16:50 | Application extens... | 1 303 KB |
| 1736B3F1 374B9CFEB837C838 39A4ABGAA.DLL | 10.04.2019 16:50 | Application extens... | 10 KB |
| 5473B6F13519A6B09F691AF337188A5C.DLL | 10.04.2019 16:50 | Application extens... | 1 KB |
| A8051C84A664187A5E9123DA4262FC26.DLL | 10.04.2019 16:50 | Application extens... | 11 866 KB |
| BC172B1B0CZ27D2E3AA3C0EB0E2160DA.DLL | 10.04.2019 16:50 | Application extens... | 86 KB |
| C1BFCDBA36C3288B23B499FE2AC2DC6A.DLL | 10.04.2019 16:50 | Application extens... | 5 853 KB |
| D23871B32CF5DFA1FEE1805T2BF5C34D.DLL | 10.04.2019 16:50 | Application extens... | 58 KB |
| E3E0986337C902CC41C6A5C239C7E678.DLL | 10.04.2019 16:50 | Application extens... | 83 665 KB |

Fig. 2b

| | | | |
|---|---|---|---|
| ☐ | F00yOnFicGCOAH4BEduAfEmxJ83m4.lol | 08.04.2019 12:03 | LOL File |
| ▨ | HELP HELP HELP | 10.04.2019 18:01 | Text Document |
| ☐ | HOjgS1e4EZR1pJSEPdO4jKihpi2w19xNEGpG25Soc64SZOEm.lol | 01.09.2015 18:54 | LOL File |
| ☐ | iB46SGSwsLxgIPmjxUXDGn9a.lol | 08.04.2019 12:03 | LOL File |
| ☐ | j34BL4kp01IPzWjHTZRjT+dNYFp9IEG6X34.lol | 10.04.2019 16:06 | LOL File |
| ☐ | Kwxevx0oHyz2SSAR9SGEiQ8MyjVpvu5CSvOyGzgHH12NeNoP5aSlAPGOuwz7o2rcwDP+cVvHh8MzA.lol | 13.03.2019 19:19 | LOL File |
| ☐ | nz835XYm13igMxfMq+DPpohGTf8Cz+Zu.lol | 10.04.2019 16:08 | LOL File |
| ☐ | oDTyX04N3YPFkW7urs6R821szE2QbYtzlo8.lol | 10.04.2019 16:16 | LOL File |
| ☐ | QupAkDyRX9nG2JB9ZyiP4KtKkj0NtQ.lol | 25.02.2019 20:51 | LOL File |
| ☐ | Tka5cX86I8I5wmHqyzkyHR3NJcWgDaegk4s.lol | 10.04.2019 13:46 | LOL File |
| ☐ | TvPxwaUDf9LC40Wp540.lol | 10.04.2019 16:09 | LOL File |
| ☐ | XLVShTkHrRveyTPeCg5SzGtGlu8BUgCXgTe5MTO0MC4.lol | 15.03.2019 16:47 | LOL File |

Fig. 2c

| | | | | |
|---|---|---|---|---|
| | fakenet.1.4.3.zip.no_more_ransom | 10.04.2019 18:47 | NO_MORE_RANS... | 5 854 KB |
| | flat_land.pdf.no_more_ransom | 10.04.2019 18:47 | NO_MORE_RANS... | 938 KB |
| | How Recovery Files | 10.04.2019 18:47 | Text Document | 1 KB |
| | odbg110.zip.no_more_ransom | 10.04.2019 18:47 | NO_MORE_RANS... | 1 304 KB |
| | OLLYDBG.exe.no_more_ransom | 10.04.2019 18:47 | NO_MORE_RANS... | 1 093 KB |
| | providers.txt.no_more_ransom | 10.04.2019 18:47 | NO_MORE_RANS... | 89 KB |
| | provsearch.py.no_more_ransom | 10.04.2019 18:47 | NO_MORE_RANS... | 2 KB |
| | PSAPI.DLL.no_more_ransom | 10.04.2019 18:47 | NO_MORE_RANS... | 19 KB |
| | Security life.docx.no_more_ransom | 10.04.2019 18:47 | NO_MORE_RANS... | 658 KB |
| | SpaceTime.mp4.no_more_ransom | 10.04.2019 18:47 | NO_MORE_RANS... | 11 807 KB |
| | Tak.jpg.no_more_ransom | 10.04.2019 18:47 | NO_MORE_RANS... | 12 KB |
| | Wireshark-pdb-win32- 2.2.1.zip.no_more_ransom | 10.04.2019 18:47 | NO_MORE_RANS... | 83 666 KB |

Fig. 2d

SYSTEM AND METHOD FOR IDENTIFYING A CRYPTOR THAT ENCODES FILES OF A COMPUTER SYSTEM

CROSS REFERENCE TO RELATED APPLICATIONS

The present application claims priority to Russian Patent Application No. 2020128090, filed on Aug. 24, 2020, the entire content of which is incorporated herein by reference.

FIELD OF TECHNOLOGY

The present disclosure relates to the field of data security. Specifically, to systems and method for identifying a cryptor that encodes files of a computer system.

BACKGROUND

The rapid development of computer technology in recent years, together with the widespread distribution of computing devices (personal computers, notebooks, tablets, smartphones, etc.), has strongly stimulated the use of these devices in various fields of activity and for an enormous number of tasks (from the processing and storage of private photographs to bank transfers and electronic document management). The growth in the number of computing devices and the software operating in these devices has been accompanied by a rapid growth in the amount of harmful software.

There are currently many different types of harmful software, the great majority of which are designed to make a profit for their creators. One type of harmful software steals users' personal and confidential data (such as log-ins and passwords, bank account details, electronic documents and the like) from their devices. Another type of harmful software forms what are known as botnets from users' devices, in order to attack other computers, computer networks or web resources (by "denial of service" attacks or "brute force" attacks, for example). A third type of harmful software offers paid content to users through persistent advertising, paid subscriptions, SMS transmission to paid numbers, and the like.

One variety of harmful software consists of harmful software programs for the purpose of extortion (known as ransomware). When these extortion programs appear on users' devices, they make the devices inoperable (for example, by blocking input devices, damaging data, limiting access to elements of the interface, etc.). The victim is usually urged to pay for the restoration of access to his/her files, but, even when this has been done, the malicious parties do not always restore the data or the control of the device to its lawful owner. The most dangerous extortion programs consist of harmful software that encrypts files (cryptors). Their harmful action consists of damaging data that is valuable to users (such as databases, Microsoft Office documents, photographs, video files, etc.). The data are damaged by the encryption, renaming, or concealment of files containing these data. Since both the confidentiality and the integrity of data are often highly valued, the protection of data is an important task.

One way of counteract the aforementioned threat is to detect a harmful application on a user's device in good time and then to deactivate it, thereby protecting data from unsanctioned modification, while also regularly creating back-up copies of data so that the data can be restored even in case of unsanctioned modification. However, new forms of cryptors are continuously created. Because of appearances of new forms of cryptors, new signatures must be regularly written in order to identify them. A large amount of computing resources of various kinds are expended on tasks for updating signatures. However, in some cases, the cryptors decrypt themselves after launching using unique decompressors—thereby increasing the complexity of signature-based detections needed to keep computes safe from such attacks.

Another approach is based on behavioral detection. Behavior detection provides a more flexible approach compared to signature detection. This is mainly because behavior based detection is based on monitoring characteristic features of cryptor distributions. This provides opportunities for detecting an appearance or modification of a large number of files. However, these also has shortcomings.

Firstly, the distinctive feature of cryptors is that they deny access to many, or even all, files of given types (images, financial documents, etc.) on a hard disk. By the time this behavior is detected, some of the data will be encrypted. To counteract the operation of cryptors, back-up copying of affected files may be used, but this requires further resource expenditure, and consequently slowing down the operation of legitimate software.

Secondly, there are a number of programs whose behavior also shows features associated with actions in the file system that are characteristic of cryptors. For example, archiver applications have many behavioral characteristics that are characteristic of cryptors. For example, both types of software may rapidly modify a large number of user files, and the files resulting from their execution have many similar features. It is hard to find any difference between cryptors and archiver applications using deterministic rules or analytical algorithms. This may result in the erroneous classification of archival types of programs as harmful. In other words, there may be an increase in type II errors (false negatives). And yet, files installed by harmful software show certain differences from legitimate user files, and it has been proposed that encrypted files should be searched for according to these differences in order to detect the activity of Trojan cryptors.

However, most of the existing methods of detecting cryptors do not use a key feature of harmful encrypting software, namely the creation of sacrificial files on the computer, in which the information cannot be read by a user without decryption by the malicious parties. This gives rise to the technical problem of the high level of type I (false positive) and type II errors for the identification of harmful software which encrypts the files of a computer system.

Therefore, there is a need for a more optimal and effective way of detecting cryptors using up-to-date machine learning methods. In other words, there is a need for a system and method of identifying cryptors that encode files of a computer system.

SUMMARY

Aspects of the disclosure relate to data security, more specifically, to systems and methods of identifying cryptors that encode files of a computer system.

In one exemplary aspect, a method is provided for identifying a cryptor that encodes files of a computer system, the method comprising: identifying one or more files into which a data entry is performed by a suspect process; for each identified file, determining characteristics of the identified file, identifying classes of file modifications using a trained machine learning model and respective characteristics of the identified file, and identifying a suspect process as being associated with the cryptor based on the identified classes of file modification of the file, and protecting the computer system from the cryptor.

In one aspect, the method further comprises: detecting harmful software by sequentially examining all processes of the computer system, wherein the sequential examination includes identifying the process under examination as the suspect process.

In one aspect, the suspect process is associated with an updatable list of predetermined processes.

In one aspect, the classes of file modifications include at least one class for file modifications made by a cryptor and at least one other class for file modifications made by legitimate software.

In one aspect, the protection of the computer system includes at least one of: stopping the suspect process and all streams and other processes associated with the suspect process; removing or quarantining a file from which the suspect process was launched; restoring, from a back-up copy, the one or more files into which the data entry was performed by the suspect process, wherein the back-up copy of the one or more files were created and stored before the entering of the data into the one or more files by the suspect process occurred; and renewing antivirus databases and launching the antivirus to perform an on-demand scanning.

In one aspect, for each identified file, the machine learning model determines a probability of the modification of the file belonging to one of the classes of file modification.

In one aspect, the method further comprises: determining, by the analyzer, a number of the one or more files for which the probability of the modifications of the file by the cryptor exceeds a first threshold; and when the determined number of the one or more files for which the probability of the modifications of the file exceeds the first threshold is greater than a second threshold, identifying the suspect process as being associated with the cryptor.

In one aspect, the identification of the suspect process as being associated with the cryptor is performed using a trained second machine learning model that receives the identified classes of file modification of the file as input data.

In one aspect, the trained second machine learning model further receives identified characteristics of the suspect process as input data.

In one aspect, the trained second machine learning model comprises a machine learning model trained based on at least one of: a neural network, a decision tree, a random forest, a support vector machine, a k-nearest neighbors method, a logistic regression method, a linear regression method, a Bayesian classification method, and a gradient boosting method.

In one aspect, the identification of the one or more files into which the data entry is performed is based on processing of system calls for operations with streams and/or writing to streams.

In one aspect, the identification of the one or more files includes identifying characteristics of each identified file, the characteristics including at least one of: an entropy of at least a part of the file, metadata of the file, metadata of the at least one part of the file, information about an application or a process that has entered data into the file.

In one aspect, the trained machine learning model used for the identification of the classes of file modifications comprises a first machine learning model based on at least one of: a neural network, a decision tree, a random forest, a support vector machine, a k-nearest neighbors method, a logistic regression method, a linear regression method, a Bayesian classification method, and a gradient boosting method.

In one aspect, the identification of the suspect process as being associated with the cryptor further comprises: identifying characteristics of the suspect process including at least an identifier and a context of the suspect process; and identifying events associated with the suspect process including one or more of: verdicts of antivirus program, changes to auto-start list, internet access, and information about the system.

According to one aspect of the disclosure, a system is provided for identifying a cryptor that encodes files of a computer system, the system comprising a hardware processor configured to: identify one or more files into which a data entry is performed by a suspect process; for each identified file, determine characteristics of the identified file, identify classes of file modifications using a trained machine learning model and respective characteristics of the identified file, and identify a suspect process as being associated with the cryptor based on the identified classes of file modification of the file; and protect the computer system from the cryptor.

In one exemplary aspect, a non-transitory computer-readable medium is provided storing a set of instructions thereon for identifying a cryptor that encodes files of a computer system, wherein the set of instructions comprises instructions for: identifying one or more files into which a data entry is performed by a suspect process; for each identified file, determining characteristics of the identified file, identifying classes of file modifications using a trained machine learning model and respective characteristics of the identified file, and identifying a suspect process as being associated with the cryptor based on the identified classes of file modification of the file; and protecting the computer system from the cryptor.

The method and system of the present disclosure are designed to provide data security, in a more optimal and effective manner and to identify harmful software which encodes files of a computer system. The first technical result is an improvement in the level of protection of computer system files against cryptors, by identifying a suspect process as being associated with a cryptor using a trained machine learning model. The machine learning model receives, as its input data, the characteristics of files created or modified by the suspect process. The second technical result is a reduction in the type I and type II errors in the identification of a suspect process associated with a cryptor using the trained machine learning model.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2a illustrates a first example of a computer directory after an operation by cryptors.

FIG. 2b illustrates a second example of a computer directory after an operation by cryptors.

FIG. 2c illustrates a third example of a computer directory after an operation by cryptors.

FIG. 2d illustrates a fourth example of a computer directory after an operation by cryptors.

DETAILED DESCRIPTION

Exemplary aspects are described herein in the context of a system, method, and a computer program for identifying processes associated with a harmful software that encodes files of a computer system in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The systems and methods of the present disclosure enable identifying of software that causes harm for computer systems by encoding files of the computer systems. The systems and methods also reduce type I and type II errors in the identification of suspect processes associated with a cryptor using a trained machine learning model.

Figure 1:
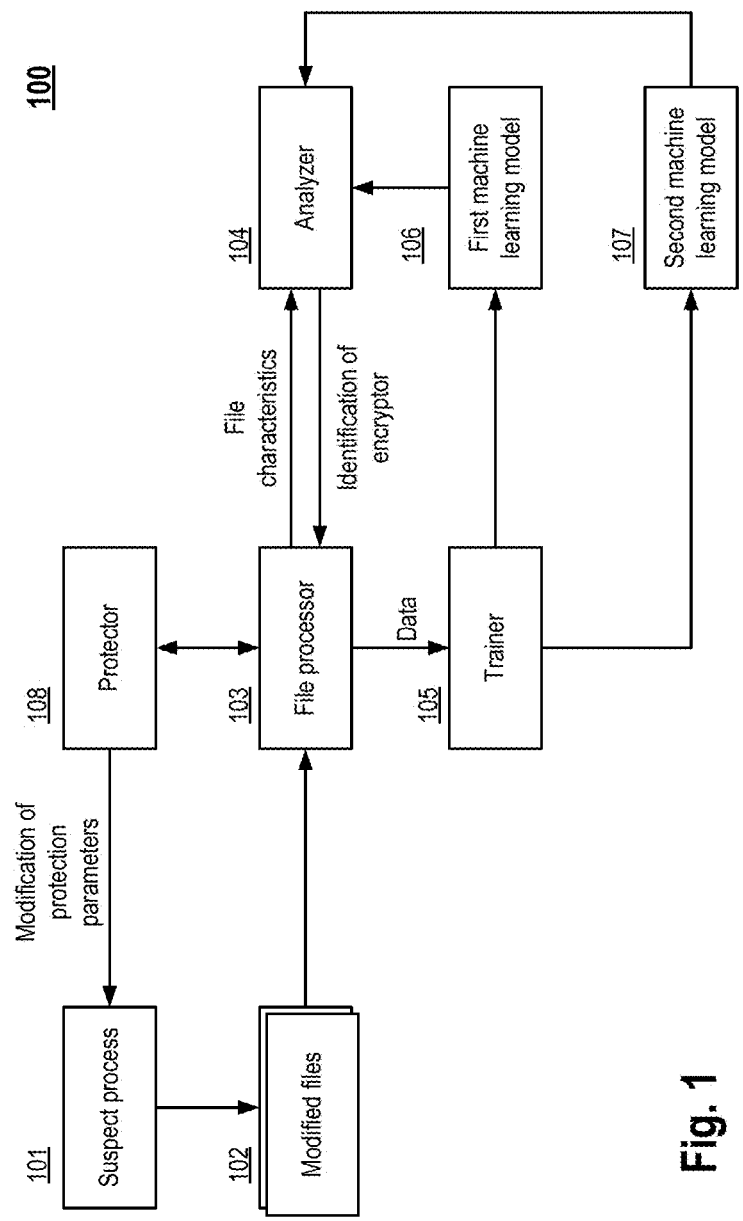
FIG. 1 illustrates a system for identifying cryptors.

FIG. 1 illustrates an exemplary system 100 for identifying cryptors. The system 100 is implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 5). Furthermore, the system components may be realized either within a single computing device or spread out among several interconnected computing devices. Thus, the system 100 may be realized using appropriate hardware components and/or software modules, which may be arranged together or may reside at several locations or on several devices. The components and/or modules of the systems may then interact or exchange data by one or more wireless communication lines, wired communication lines, cellular communications, a client/server architecture, a peer-to-peer architecture, and so forth.

The system 100 includes a file processor 103 designed to identify at least one file 102 (also known as a modified file) in which data have been entered by the suspect process 101. The identification of files 102 is based on processing of system calls, particularly for operations with files used by the suspect process 101 (such as the WinAPI CreateFile function). In one aspect, system calls for operations with streams, writing to streams, etc., are also monitored. The file processor 103 is also designed to identify characteristics of each identified file 102. In one aspect, the characteristics of the file 102 include at least one of: an entropy (information entropy) of at least a part of the file 102, metadata of the file 102 (e.g., filename extension, type, header, etc.), and the part of the file 102. In another aspect, the characteristics of the file 102 include information about an application or a process that has entered data into the file 102. Other examples of characteristics of the file 102 are described below.

The system 100 also includes an analyzer 104 which is associated with the file processor 103 and is designed to identify one or more classes of modifications of each file 102 that is identified as being a modified file. The identification of the classes of modification is performed using a trained first machine learning model 106 which receives the aforesaid characteristics of the file 102 as its input data. In one aspect, the classes of modification of the file 102 include at least the following classes: modifications made by a cryptor, and modifications made by legitimate software. For each aforesaid file 102, the analyzer 104 is also designed to identify a suspect process 101 as being associated with a cryptor based on the identified classes of modifications of the file 102.

The system 100 further includes trainer 105, designed for training the first machine learning model 106 on the data of a training sample including the characteristics of files created or modified by at least one known process and associated with at least one known cryptor.

In one aspect, the first machine learning model 106 is one of the following types:
 a) neural network;
 b) decision tree;
 c) random forest;
 d) support vector machine;
 e) k-nearest neighbors method;
 f) logistic regression;
 g) linear regression;
 h) Bayesian classification; and
 i) gradient boosting.

It should be noted that, in one aspect, the training sample includes only the characteristics of files created or modified by at least one known process that is associated with at least one known cryptor. That is to say, the characteristics of the initial files, before their modification by the process associated with a cryptor, will not be used for training the first machine learning model 106. This approach has a number of advantages. In particular, the first machine learning model 106 trained on the aforesaid training sample will have a high classification quality and a low number of type I and type II errors in the classification of cryptors for which it is impossible to identify the state of a file before its modification by the cryptor.

In another aspect, however, the training sample also includes the characteristics of files created or modified by at least one known process launched by a legitimate file (application).

The first machine learning model 106 identifies whether the modifications of the file belong to one of two classes of modification. In one aspect, the first machine learning model 106 used for this purpose is a classification (supervised learning) model operating on the two aforesaid classes. In another aspect, the first machine learning model used is a clustering model or an anomaly detection model (unsupervised learning).

In one aspect, the first machine learning model 106 comprises a learning model based on a fully connected neural network. In one aspect, the parameters for the neural network, such as a number of internal layers and neurons, an activation function, etc., are chosen so as to provide the best classification quality and the smallest number of type I and type II errors. In one aspect, the following functions may be used as the activation function: ReLU (Rectified Linear Unit), softmax, logistic function, Heaviside function, and others.

When an anomaly detection model is used for classification for the first machine learning model 106, a training sample consisting of a single class may be used. That is to say, the training sample will include the characteristics of files created or modified by a legitimate piece of software or cryptor. Each of the groups may be examined as anomalous in relation to the other. The anomaly detection will therefore correspond to one class and the absence of anomaly will correspond to the other class.

In one aspect, the training sample contains files created or modified by known cryptors. In this case, the files created or modified by previously unknown cryptors will also be detected by the system 100 for identifying cryptors as training properties of machine learning models. Thus, computer system files will be given a higher level of protection, not only against known cryptors, but also against previously unknown cryptors. By using the method of the present disclosure, it is possible to reduce the type I and type II errors in identification of a suspect process 101 associated with a cryptor. In another aspect, the training sample includes the characteristics of files created or modified by legitimate software.

In yet another aspect, the trainer 105 is additionally designed for: testing the trained first machine learning model 106 on the data of test, and validating samples. The testing of the trained first machine learning model includes testing for characteristics of files created or modified by at least one known process and associated with at least one known cryptor, wherein the files in the test are absent from the training sample. Similarly, the validation is for characteristics of files created or modified by at least one known process and associated with at least one known cryptor, wherein the validation samples are absent from the training sample.

In one aspect, for each identified file 102, the first machine learning model 106 additionally determines a probability of the modifications of the file belonging to one of the classes of modification.

In one aspect, the analyzer 104 determines the number of files (out of the identified files 102) for which the probability of modification of the file by a cryptor exceeds a first threshold (0.5, for example). Then, when the determined number of files exceeds a second threshold (3, for example), the analyzer 104 identifies the suspect process 101 as being associated with a cryptor. For example, if the number of files, for which the probability of file modification by a cryptor exceeds 0.5 is greater than 3, then the suspect process 101 will be identified as being associated with a cryptor.

The approaches described above make it possible to reduce the number of false positives when compared to the signature and heuristic approaches in which the modifications of one file are examined according to specified rules. When using the signature and heuristic approaches, if one file is modified by legitimate software (such as an archiver), and contains modifications characteristic of cryptors, the suspect process 101 may be recognized as a cryptor, even if it is in fact a legitimate process.

In one aspect, as described above, the present disclosure uses distinctive parameters and features that may be used by the analyzer 104 for identification of cryptors. Some examples are given below of various distinctive parameters and features that are characteristic of files created or modified by cryptors.

In one aspect, the file parameters and features mentioned below may also be employed as file characteristics to be used by the analyzer 104.

One file characteristic is entropy (information entropy). The information entropy may be calculated by any formula known in the relevant art, particularly the following:

$$H = -\Sigma_{i=0}^{255} p(i) \log p(i).$$

where H is the information entropy, and p(i) is the probability of the appearance of a symbol with the value i.

Cryptors use encryption algorithms such as AES, RSA, RC4 and others for their operation. There are various criteria for evaluating the quality of encryption algorithms, for example the comparison of entropy values. The entropy value may be used for the recognition of encrypted or random data, and specific entropy values are characteristic of various file formats. However, the identification of files modified by a cryptor on the basis of file entropy values alone will be subject to type I errors. This is because the archive formats "rar", "zip", "7z" and the like have a similar entropy to files created by a harmful cryptor (if they have a similar level of compression), but are distinguished by the presence of a specific file structure by means of which they can be uncompressed. Particular attention must be paid to formats such as "docx", since they also consist of archives, are widely used and are subject to encryption. It must also be borne in mind that there are vast numbers of widely known file formats, and companies may create special formats for internal use. The comparison of files created by a program with a collection of known formats is therefore ineffective as a means of identifying harmful activity and cryptors.

Further difficulties are caused by cryptors that do not modify a file as a whole, but only encrypt part of the file. For such cases, the entropy of individual parts of a file may be calculated. For example, a file may be divided into parts of equal size and the entropy of each part of the file (referred to below as the piecewise entropy) may then be calculated. In many archives, part of the file is separated off to retain the original file names, but this rarely occurs in cryptors. The minimum piecewise entropy may therefore be used as another file characteristic.

The entropy value is affected by the file size; therefore, the file size may also be used as a file characteristic.

In many cases, the characteristic features of files created by cryptors are the specific names of the encrypted files. Therefore, the file names may also be used as one of the file characteristics.

FIG. 2a illustrates a first example of a computer directory after an operation by cryptors. In some cases, email addresses of malicious parties commonly appear in file names. For instance, in FIG. 2a, an example of a directory after the operation of the Trojan-Ransom.Win32.Crysis cryptor is illustrated. Information about the presence or absence of strings in the name corresponding to the RFC 5322 mailbox format may therefore be used as another file characteristic.

FIG. 2b illustrates a second example of a computer directory after an operation by cryptors. In FIG. 2b, an example of a directory after the operation of another type of cryptor is illustrated, wherein the cryptor modifies the file names and the modified file names consist a string of hexadecimal characters. Thus, conformity or non-conformity with format may be used as the input to the analytical part of the system. In another aspect, a parameter such as for range of symbols may be used, names having file extensions or a period symbol may be used, etc. These other features are not typically characteristic features of legitimate files but are encountered among files encrypted by cryptors, thus, files with these non-typical features may be identified and placed in a separate group. It is also possible to check for the presence or absence of special symbols that are seldom encountered in legitimate file names, but are present in encrypted file names, such as "[", "]", "{", "}", "@", arithmetic operation symbols and others. FIG. 2c illustrates a third example of a computer directory after an operation by cryptors wherein special symbols are encountered. All the aforesaid parameters and features may be used as file characteristics by the analyzer 104.

In executable files, archives, and "docx" and "pdf" formats there are byte sequences that may be interpreted as strings of a given length. In encrypted files, however, the string length is extremely short, and they take the form of sequences of random symbols, which are rarely encountered in legitimate files. The number of strings, the length of the longest of them and the average string length may be chosen as file characteristics.

In most cases, cryptors exchange file extensions for nonexistent ones, and therefore the characteristic of a file extension corresponding to a nonexistent format may also be used as a file characteristic. FIG. 2d illustrates a fourth example of a computer directory after an operation by cryptors, e.g., a Rapid cryptor. In this case, the file extensions are very long, which is not typical of legitimate files.

Yet another distinctive property of encrypted files is the presence of specific words such as "lol", "fox", "ransom" and others. When signature-based detection methods are used, it is necessary to create a "whitelist" of permitted file extensions or a "blacklist" of prohibited extensions. That is to say, software that has created a number of files with such an extension would be considered to be harmful. However, the creation of such whitelists and blacklists is an extremely labor-intensive task, and the lists must always contain up-to-date information on all extensions used both in legitimate software and in harmful software, something which is impossible. Moreover, there are situations in which harmful software may mimic legitimate software, and in these cases cryptors will not be detected. Consequently, the aforesaid approach is not complete in itself. However, lists of this type may be added as file characteristics to the first machine learning model 106. In this case, the file extension will be compared against a kind of scale in which, for example, zero indicates a trusted extension, but a larger value is assigned to a group with more suspect extensions. By taking other file characteristics and parameters of the first machine learning model 106 into account, the cryptor detection level may be improved.

In one aspect, the analyzer 104 identifies a suspect process 101 as being associated with a cryptor (that is to say, the class of modification corresponds to a modification made by a cryptor) if the number of files classified as being modified by a cryptor exceeds a second threshold. In a preferred aspect, when the analyzer 104 identifies a class of modification for each identified file 102, the probability of membership to a class of modifications is not necessarily determined.

In one aspect, the analyzer 104 is also used to identify a suspect process as being associated with a cryptor by using a trained second machine learning model 107. The second machine learning model 107 receives, as its input data, the identified classes of modification for each identified file 102; that is to say, the second machine learning model receives the result of the use of the first machine learning model 106.

In yet another aspect, the file processor 103 also identifies:
 a) the characteristics of the suspect process 101, particularly the identifier of the suspect process and the context of the suspect process;
 b) events in the protector 108 (e.g., an antivirus system) associated with the process under examination, particularly the verdict of the antivirus program and individual modules of the antivirus system, a change in the auto-start list, Internet access, etc.; and
 c) information about the system.

In one aspect, the second machine learning model 107 also receives, as input data, the identified characteristics of the suspect process, the aforesaid antivirus events, and system information. The aforesaid antivirus events and system information may be determined by the file processor 103 itself or with the aid of the protector 108.

In one aspect, the second machine learning model 107 comprises a machine learning model trained based on at least one of the following:
 a) neural network;
 b) decision tree;
 c) random forest;
 d) support vector machine;
 e) k-nearest neighbors method;
 f) logistic regression;
 g) linear regression;
 h) Bayesian classification; and
 i) gradient boosting.

In yet another aspect, the trainer 105 is designed to train the second machine learning model 107 on data from a second training sample, including classes of modification of files created or modified by at least one known process associated with at least one known cryptor.

In one aspect, the second training sample includes classes of modification of files created or modified by at least one known legitimate process associated with at least one known legitimate piece of software.

In another aspect, the trainer 105 is additionally designed for testing and validating the trained second machine learning model 107. In one aspect, the testing is performed on the data of second test including characteristics of files created or modified by at least one known process and associated with at least one known cryptor, wherein the files in the second test are absent from the second training sample. Similarly, the validation is performed on validation samples including the characteristics of files created or modified by at least one known process and associated with at least one known cryptor, wherein the second validation samples are absent from the second training sample. It should also be noted that other particular implementations, described above in relation to the first machine learning model 106, may also be used for the second machine learning model 107.

Figure 3:
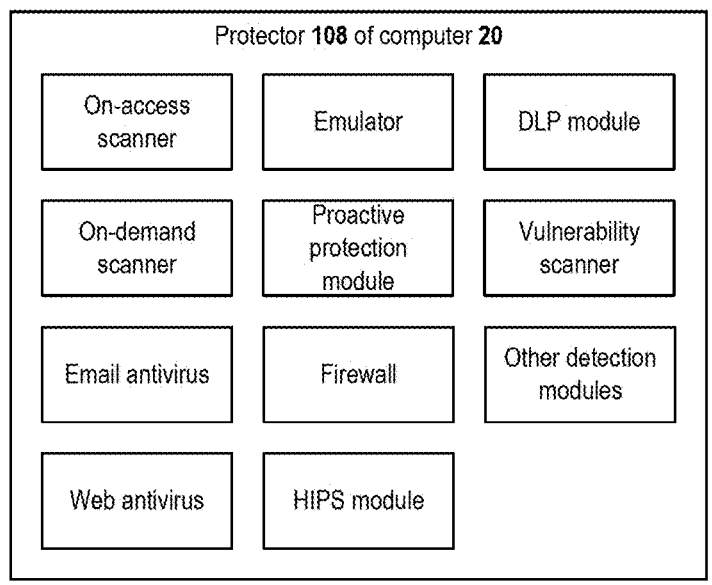
FIG. 3 illustrates an exemplary protector of a computer system.

FIG. 3 illustrates an exemplary protector of a computer system, e.g., the protector 108 of a computer 20. The protector 108 (antivirus or other form of protection of the device) may contain modules designed to ensure the security of the device. In one example, the protector 108 comprises at least one of: an on-access scanner, an on-demand scanner, an email antivirus, a web antivirus, a proactive protection module, a HIPS (Host Intrusion Prevention System) module, a DLP (Data Loss Prevention) module, a vulnerability scanner, an emulator, a firewall, and others. In one aspect, the aforesaid modules may be a constituent part of the protector 108. In another aspect, these modules may be implemented in the form of individual software components.

An on-access scanner contains functionality for identifying harmful activities in all openable, executable and storable files in the user's computer system.

An on-demand scanner differs from an on-access scanner in that it scans files and directories specified by the user, e.g., at the user's request.

An email antivirus is necessary for control of incoming and outgoing emails. The email antivirus checks the incoming and outgoing email to determine whether or not the email contains harmful software.

A web antivirus is used to prevent an execution of harmful code that may be present on websites visited by the user, and for blocking the opening of such websites.

A HIPS module is used to identify any undesired and harmful activity of programs and to block the program at the time of execution.

A DLP module is used to identify and prevent leakage of confidential data beyond the boundary of the computer or the network.

A vulnerability scanner is necessary for identifying vulnerabilities in a device (for example, if some components of the protector 108 are switched off, if virus databases are not up to date, if a network port is closed, etc.).

A firewall is used to control and filter network traffic according to specified rules.

An emulator operates by imitating a guest system during the execution of file instructions in the emulator and obtain results that will be examined in detail subsequently.

A proactive protection module uses behavioral signatures to identify the behavior of executable files and their classification by confidence level. It should be noted that the protector 108 may also include other modules for the implementation of the functionality described in FIG. 1.

Figure 4:
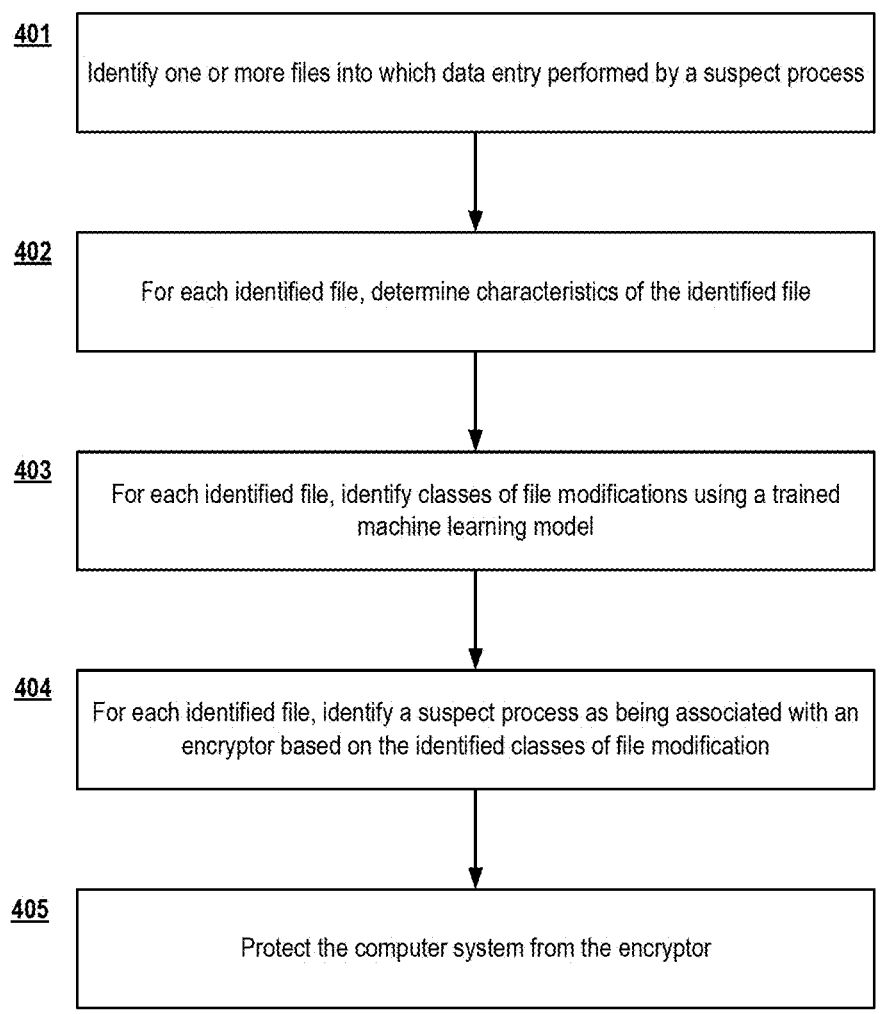
FIG. 4 illustrates an exemplary method for identifying processes associated with a harmful software that encodes files of a computer system.

FIG. 4 illustrates an exemplary method 400 for identifying a cryptor. For example, method 400 identifies processes associated with a harmful software, e.g., cryptor, that encodes files of a computer system. When an unknown file is executed, a new process is created (by the WinAPI CreateProcess function for example) with a new process identifier (PID). The method of the present disclosure examines this new process as a suspect process. It should also be noted that the method of the present disclosure also allows a process to be identified as being associated with a cryptor when the process is trusted (a system process for example) but creates or modifies files in the same way as cryptors. This situation may occur in the case of fileless harmful software (fileless malware) are used. This harmful software may use trusted PowerShell software, for example, for executing harmful commands. The harmful code is not stored on the disk in the form of files, but is contained in the random-access memory only, and therefore cannot be detected by scanning files in the computer system.

Figure 5:
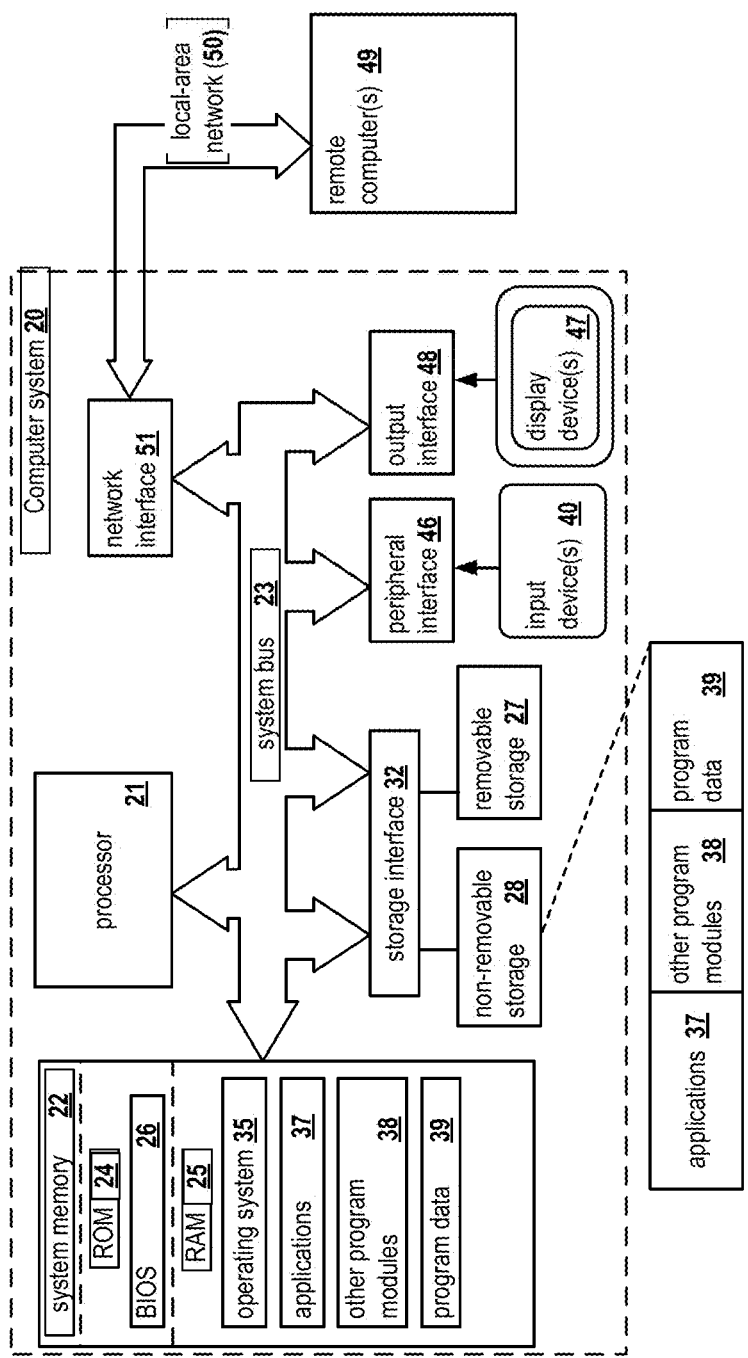
FIG. 5 presents an example of a general purpose computer system on which aspects of the present disclosure can be implemented.

Thus, in one aspect, the method of the present disclosure detects fileless harmful software by examining all processes of the computer system as suspect processes. In another aspect, the method scans only those processes that are on a specified updatable list, instead of scanning all the processes as suspect processes. This updatable list may include suspect system processes and those that are most commonly used by cryptors. In one aspect, method 400 for identifying a cryptor is implemented in a computing device, e.g., as shown in FIG. 5. This updatable list may be updated manually or automatically, in case new suspect processes are detected or new processes that are most commonly used by cryptors are detected.

In step 401, method 400, by the file processor 103, identifies one or more files 102 into which data entry is performed by a suspect process 101. The entering of the data includes at least one of a creation of a new file and a modification of an existing file. In one aspect, the identification of the at least one file 102 is based on processing of system calls for operations with files used by the suspect process 101.

In step 402, method 400, by the file processor 103, for each identified file 102 of the one or more files, determines characteristics of the identified file 102.

In step 403, method 400, by the analyzer 104, for each identified file, identifies classes of file modifications. The identification of the classes of file modifications is performed using a trained first machine learning model 106 and respective characteristics of the identified file. Thus, in one aspect, the first machine learning model 106 receives, as its input data, the aforesaid characteristics of the identified file 102.

In one aspect, the classes of file modifications include at least one class for file modifications made by a cryptor and at least one other class for file modifications made by legitimate software.

In step 404, method 400, by the analyzer 104, for each identified file, identifies a suspect process 101 as being associated with a cryptor based on the identified classes of file modification for each of the files 102.

In step 405, method 400, by the protector 108, protects the computer system from the cryptor. Thus, after identifying the suspect process 101 as being associated with a cryptor, the protector 108 protects the computer system from the actions of the cryptor.

In one aspect, the protection of the computer system includes at least one of:
a) stopping the suspect process and all streams and other processes associated with the suspect process;
b) removing or quarantining a file from which the suspect process was launched;
c) restoring, from a back-up copy, the one or more files into which the data entry was performed by the suspect process, wherein the back-up copy of the one or more files were created and stored before the entering of the data into the one or more files by the suspect process occurred; and
d) renewing antivirus databases and launching the antivirus to perform an on-demand scanning.

In one aspect, wherein, for each identified file, the machine learning model determines a probability of the modification of the file belonging to one of the classes of file modification.

In one aspect, the method further comprises: determining, by the analyzer, a number of the one or more files for which the probability of the modifications of the file by the cryptor exceeds a first threshold, and when the determined number of the one or more files for which the probability of the modifications of the file exceeds the first threshold is greater than a second threshold, identifying the suspect process as being associated with the cryptor.

The particular examples of embodiment described in the system according to FIG. 1 are also applicable to the method according to FIG. 4. Thus, the claimed system and method enables identification of processes associated with harmful software, e.g., software which encrypt files of a computer system. An improvement in the level of protection of computer system files against cryptors is achieved by: identification of a suspect process as being associated with a cryptor, and using a trained machine learning model which receives as its inputs the characteristics of files created or changed by the suspect process. In addition, a reduction in the type I and type II errors is achieved for the identification of a suspect process associated with a cryptor. The reductions are the errors are achieved by using a trained machine learning model which receives as its input data the characteristics of files created or modified by a suspect process.

FIG. 5 is a block diagram illustrating a computer system 20 on which aspects of systems and methods for identifying a cryptor that encodes files of a computer system may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for identifying a cryptor that encodes files of a computer system, the method comprising:
   identifying, by a file processor, one or more files into which a data entry is performed by a suspect process, wherein the identification of the one or more files includes identifying characteristics of each identified file, the characteristics including at least an entropy of at least a part of the file;
   for each identified file, determining, by the file processor, characteristics of the identified file;
   for each identified file, identifying, by an analyzer, classes of file modifications using a trained machine learning model and respective characteristics of the identified file, wherein the classes of file modifications include at least one class for file modifications made by a cryptor and at least one other class for file modifications made by legitimate software, wherein, for each identified file, the trained machine learning model determines a probability of the modification of the file belonging to one of the classes of file modification;
   for each identified file, identifying, by the analyzer, a suspect process as being associated with the cryptor based on the identified classes of file modification of the file;
   protecting the computer system from the cryptor;
   determining, by the analyzer, a number of the one or more files for which the probability of the modifications of the file by the cryptor exceeds a first threshold; and
   when the determined number of the one or more files for which the probability of the modifications of the file exceeds the first threshold is greater than a second threshold, identifying the suspect process as being associated with the cryptor.

2. The method of claim 1, further comprising:
   detecting harmful software by sequentially examining all processes of the computer system, wherein the sequential examination includes identifying the process under examination as the suspect process.

3. The method of claim 1, wherein the suspect process is associated with an updatable list of predetermined processes.

4. The method of claim 1, wherein the protection of the computer system includes at least one of:
   stopping the suspect process and all streams and other processes associated with the suspect process;
   removing or quarantining a file from which the suspect process was launched;
   restoring, from a back-up copy, the one or more files into which the data entry was performed by the suspect process, wherein the back-up copy of the one or more files were created and stored before entering of the data into the one or more files by the suspect process occurred; and renewing antivirus databases and launching the antivirus to perform an on-demand scanning.

5. The method of claim 1, wherein the identification of the suspect process as being associated with the cryptor is performed using a trained second machine learning model that receives the identified classes of file modification of the file as input data.

6. The method of claim 5, wherein the trained second machine learning model further receives identified characteristics of the suspect process as input data.

7. The method of claim 5, wherein the trained second machine learning model comprises a machine learning model trained based on at least one of: a neural network, a decision tree, a random forest, a support vector machine, a k-nearest neighbors method, a logistic regression method, a linear regression method, a Bayesian classification method, and a gradient boosting method.

8. The method of claim 1, wherein the identification of the one or more files into which the data entry is performed is based on processing of system calls for operations with streams and/or writing to streams.

9. The method of claim 1, wherein the identification of the one or more files includes identifying characteristics of each identified file, the characteristics further including at least one of: metadata of the file, metadata of the at least one part of the file, information about an application or a process that has entered data into the file.

10. The method of claim 1, wherein the trained machine learning model used for the identification of the classes of file modifications comprises a first machine learning model based on at least one of: a neural network, a decision tree, a random forest, a support vector machine, a k-nearest neighbors method, a logistic regression method, a linear regression method, a Bayesian classification method, and a gradient boosting method.

11. The method of claim 1, wherein the identification of the suspect process as being associated with the cryptor further comprises:
identifying characteristics of the suspect process including at least an identifier and a context of the suspect process; and
identifying events associated with the suspect process including one or more of verdicts of antivirus program, changes to auto-start list, internet access, and information about the process.

12. A system for identifying a cryptor that encodes files of a computer system, comprising:
at least one processor configured to:
identify, by a file processor, one or more files into which a data entry is performed by a suspect process, wherein the identification of the one or more files includes identifying characteristics of each identified file, the characteristics including at least an entropy of at least a part of the file;
for each identified file, determine, by the file processor, characteristics of the identified file;
for each identified file, identify, by an analyzer, classes of file modifications using a trained machine learning model and respective characteristics of the identified file, wherein the classes of file modifications include at least one class for file modifications made by a cryptor and at least one other class for file modifications made by legitimate software, wherein, for each identified file, the trained machine learning model determines a probability of the modification of the file belonging to one of the classes of file modification, and wherein the training of the machine learning model is based on characteristics of files created or modified by processes of at least one known cryptor;
for each identified file, identify, by the analyzer, a suspect process as being associated with the cryptor based on the identified classes of file modification of the file;
protect the computer system from the cryptor;
determine, by the analyzer, a number of the one or more files for which the probability of the modifications of the file by the cryptor exceeds a first threshold; and
when the determined number of the one or more files for which the probability of the modifications of the file exceeds the first threshold is greater than a second threshold, identifying the suspect process as being associated with the cryptor.

13. The system of claim 12, the process further configured to:
detect harmful software by sequentially examining all processes of the computer system, wherein the sequential examination includes identifying the process under examination as the suspect process.

14. The system of claim 12, wherein the suspect process is associated with an updatable list of predetermined processes.

15. The system of claim 12, wherein the protection of the computer system includes at least one of:
stopping the suspect process and all streams and other processes associated with the suspect process;
removing or quarantining a file from which the suspect process was launched;
restoring, from a back-up copy, the one or more files into which the data entry was performed by the suspect process, wherein the back-up copy of the one or more files were created and stored before entering of the data into the one or more files by the suspect process occurred; and
renewing antivirus databases and launching the antivirus to perform an on-demand scanning.

16. A non-transitory computer readable medium storing thereon computer executable instructions for identifying a cryptor that encodes files of a computer system, including instructions for:
identifying, by a file processor, one or more files into which a data entry is performed by a suspect process, wherein the identification of the one or more files includes identifying characteristics of each identified file, the characteristics including at least an entropy of at least a part of the file;
for each identified file, determining, by the file processor, characteristics of the identified file;
for each identified file, identifying, by an analyzer, classes of file modifications using a trained machine learning model and respective characteristics of the identified file, wherein the classes of file modifications include at least one class for file modifications made by a cryptor and at least one other class for file modifications made by legitimate software, wherein, for each identified file, the trained machine learning model determines a probability of the modification of the file belonging to one of the classes of file modification, and wherein the training of the machine learning model is based on characteristics of files created or modified by processes of at least one known cryptor;

for each identified file, identifying, by the analyzer, a suspect process as being associated with the cryptor based on the identified classes of file modification of the file;

protecting the computer system from the cryptor;

determining, by the analyzer, a number of the one or more files for which the probability of the modifications of the file by the cryptor exceeds a first threshold; and when the determined number of the one or more files for which the probability of the modifications of the file exceeds the first threshold is greater than a second threshold, identifying the suspect process as being associated with the cryptor.

17. The non-transitory computer readable medium of claim 16, the instructions including further instructions for:
   detecting harmful software by sequentially examining all processes of the computer system, wherein the sequential examination includes identifying the process under examination as the suspect process.

18. The non-transitory computer readable medium of claim 16, wherein the suspect process is associated with an updatable list of predetermined processes.

\* \* \* \* \*